US007656636B2

(12) United States Patent
Houbre

(10) Patent No.: US 7,656,636 B2
(45) Date of Patent: Feb. 2, 2010

(54) ELECTRONIC TRIP DEVICE PROVIDED WITH A POWER SUPPLY CIRCUIT COMPRISING VOLTAGE RAISING MEANS AND CIRCUIT BREAKER COMPRISING ONE SUCH TRIP DEVICE

(75) Inventor: Pascal Houbre, Jarrie (FR)

(73) Assignee: Schneider Electric Industries SAS, Malmaison (FR)

( * ) Notice: Subject to any disclaimer, the term of this patent is extended or adjusted under 35 U.S.C. 154(b) by 554 days.

(21) Appl. No.: 11/491,235

(22) Filed: Jul. 24, 2006

(65) Prior Publication Data

US 2007/0030616 A1 Feb. 8, 2007

(30) Foreign Application Priority Data

Aug. 2, 2005 (FR) .................................. 05 08273

(51) Int. Cl.
*H01H 73/00* (2006.01)

(52) U.S. Cl. ...................................................... 361/115

(58) Field of Classification Search .................. 361/115
See application file for complete search history.

(56) References Cited

U.S. PATENT DOCUMENTS 5,541,499 A 7/1996 Villard ....................... 323/268
5,937,622 A * 8/1999 Carrier et al. ................ 56/11.9
2002/0191361 A1 12/2002 Houbre ........................ 361/97

FOREIGN PATENT DOCUMENTS

DE 197 38 699 3/1999
DE 199 54 038 5/2001
DE 100 10 924 9/2001

* cited by examiner

*Primary Examiner*—Stephen W Jackson
*Assistant Examiner*—Ann T Hoang
(74) *Attorney, Agent, or Firm*—Steptoe & Johnson LLP

(57) ABSTRACT

The electronic trip device comprises at least one current sensor, a rectifying circuit to supply a supply current, an electronic processing unit to control an actuator designed to actuate an opening mechanism of the main conductor, and an electric power supply circuit equipped with a voltage regulator designed to supply a supply voltage to the electronic processing unit. In the electronic trip device, the power supply circuit comprises voltage raising means enabling a raised voltage to be supplied to the input of the voltage regulator designed to supply the supply voltage to the electronic processing unit, said raised voltage being greater than a voltage at the terminals of the storage capacitor. The invention also relates to a circuit breaker equipped with the electronic trip device described above.

7 Claims, 5 Drawing Sheets

ELECTRONIC TRIP DEVICE PROVIDED WITH A POWER SUPPLY CIRCUIT COMPRISING VOLTAGE RAISING MEANS AND CIRCUIT BREAKER COMPRISING ONE SUCH TRIP DEVICE

BACKGROUND OF THE INVENTION

The invention relates to the field of circuit breakers and more particularly that of the electronic trip devices equipping these circuit breakers.

The invention relates more particularly to an electronic trip device for a circuit breaker, said trip device comprising:

- at least one current sensor to supply a secondary current representative of a primary current in a main conductor of said circuit breaker,
- a rectifying circuit to rectify the secondary current and supply a supply current,
- an electronic processing unit to control an actuator designed to actuate an opening mechanism of the main conductor, and
- an electric power supply circuit equipped with a storage capacitor designed to supply the actuator with electric power and with a voltage regulator designed to supply a supply voltage to the electronic processing unit, said storage capacitor being charged by means of the supply current.

The invention also relates to a circuit breaker comprising:

- at least one main conductor,
- an opening mechanism of the main conductor,
- an actuator designed to actuate the opening mechanism, and
- a trip device with an electronic processing unit to control the actuator and an electric power supply circuit designed to supply the actuator with electric power equipped with a voltage regulator designed to supply a supply voltage to the electronic processing unit.

STATE OF THE ART

In trip devices of the prior art, the voltage regulator designed to supply a supply voltage VA to the electronic processing unit is generally supplied by a voltage VM at the terminals of the storage capacitor. In these trip devices, the storage capacitor is generally charged by means of the secondary current coming from the current sensors.

One problem of trip devices of the prior art is that the charging time of the storage capacitor designed to supply electric power to the actuator is generally long. The rise time of the electronic processing unit supply voltage VA, which depends on the voltage VM at the terminals of the storage capacitor, is therefore also long. For the electronic processing unit to operate normally, the voltage VM at the terminals of the storage capacitor must be higher than the nominal value of the electronic processing unit supply voltage VA.

Thus, when the circuit breaker is powered on, the storage capacitor charge tends to delay power-on of the electronic processing unit of the trip device.

SUMMARY OF THE INVENTION

It is an object of the invention to provide an electronic trip device and a circuit breaker equipped with such a trip device, said trip device comprising, in its power supply circuit, means enabling the power-on delay of the electronic processing unit to be reduced.

The invention therefore relates to an electronic trip device comprising:

- at least one current sensor to supply a secondary current representative of a primary current in a main conductor of said circuit breaker,
- a rectifying circuit to rectify the secondary current and supply a supply current,
- an electronic processing unit to control an actuator designed to actuate an opening mechanism of the main conductor, and
- an electric power supply circuit equipped with a storage capacitor designed to supply electric power to the actuator and with a voltage regulator designed to supply a supply voltage to the electronic processing unit, said storage capacitor being charged by means of the supply current, wherein the power supply circuit comprises voltage raising means enabling a raised voltage to be supplied to the input of the voltage regulator designed to supply the supply voltage to the electronic processing unit, said raised voltage being greater than a voltage at the terminals of the storage capacitor.

In a particular embodiment, the voltage raising means comprise a resistor connected in series with the storage capacitor in such a way that, when the supply current flows to charge said storage capacitor, the raised voltage has a value greater than or equal to the sum of the voltage at the terminals of said capacitor and of the voltage at the terminals of said resistor.

In another particular embodiment, the voltage raising means comprise a voltage limiter connected in series with the storage capacitor in such a way that, when the supply current flows to charge said storage capacitor, the raised voltage quickly reaches a value greater than or equal to the sum of the voltage at the terminals of said capacitor and of a limiting voltage of said voltage limiter. Preferably, the voltage limiter is a voltage-limiting diode presenting a limiting voltage, said diode being reverse-connected.

According to a preferred embodiment, the voltage raising means comprise a resistor and a voltage limiter connected in parallel.

Preferably, in the case where the raising means comprise a voltage limiter, the limiting voltage is greater than or equal to a nominal value of the supply voltage of the electronic processing unit.

Advantageously the supply voltage at the terminals of the storage capacitor is regulated by a voltage regulator.

Preferably, the electronic trip device comprises means for filtering the raised voltage connected up-line from the voltage regulator designed to supply the supply voltage of the electronic processing unit.

The invention also relates to a circuit breaker comprising:

- at least one main conductor,
- an opening mechanism of the main conductor,
- an actuator designed to actuate the opening mechanism, and
- a trip device with an electronic processing unit to control the actuator and an electric power supply circuit designed to supply electric power to the actuator equipped with a voltage regulator designed to supply a supply voltage to the electronic processing unit, wherein the trip device is a trip device as described above, comprising voltage raising means enabling a raised voltage to be supplied to the input of the voltage regulator designed to supply the supply voltage to the electronic processing unit.

BRIEF DESCRIPTION OF THE DRAWINGS

Other advantages and features will become more clearly apparent from the following description of a particular embodiment of the invention, given as a non-restrictive example only and represented in the accompanying drawings.

DETAILED DESCRIPTION OF AN EMBODIMENT

Figure 1:
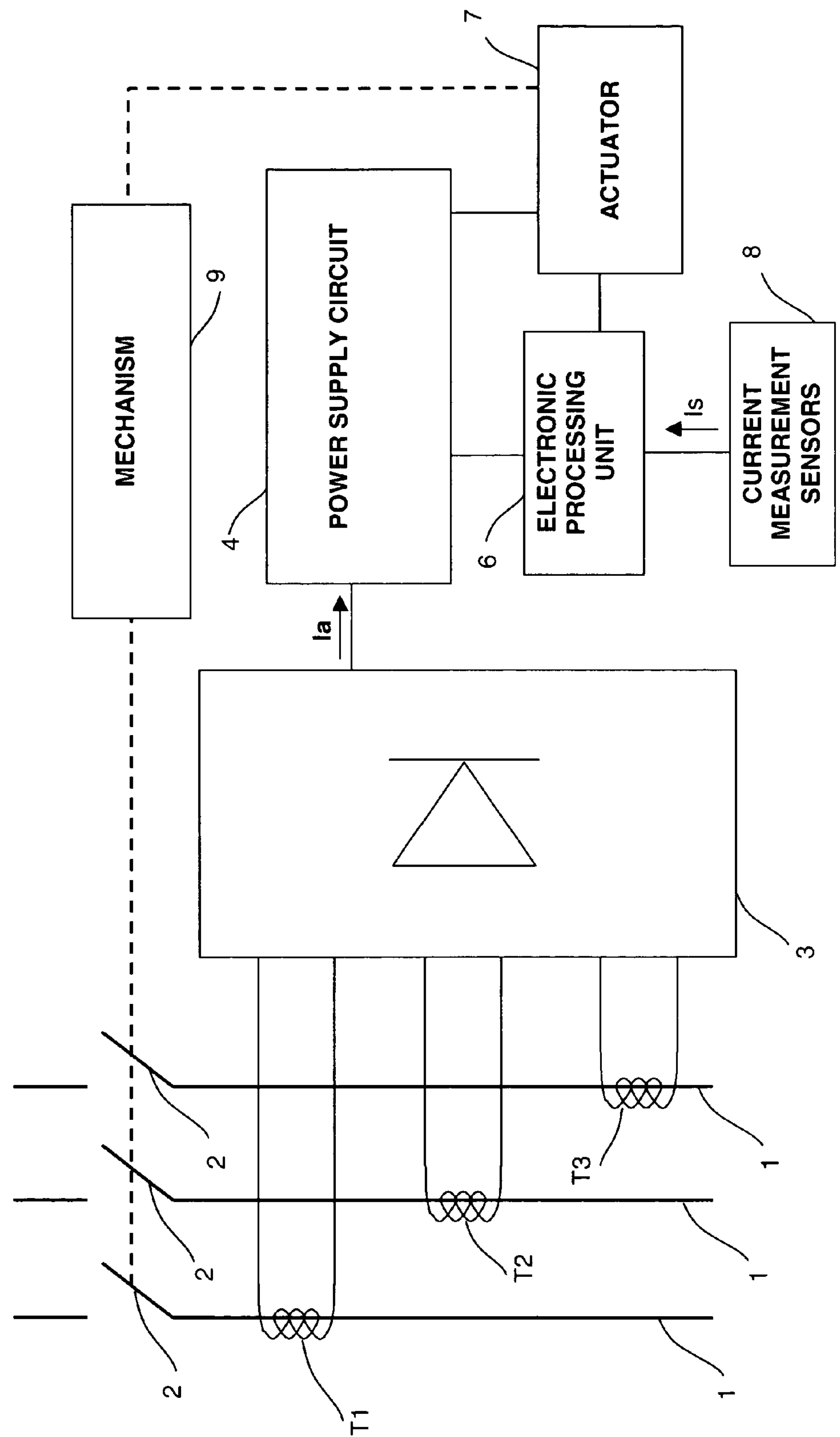
FIG. 1 represents a simplified block diagram of a circuit breaker in which a trip device according to the invention can be implemented.

The circuit breaker represented in FIG. 1 acts on three main conductors 1 of said circuit breaker. It should be noted that the device of the invention can comprise any number of main conductors. The main conductors are connected to contacts 2 enabling the primary current flowing in these conductors to be made or broken.

Current sensors T1, T2, T3 associated with the different main conductors transform the primary current of high value into a secondary current compatible with the electronic trip device. A rectifying circuit 3 supplies a supply current Ia to a power supply circuit 4 of the trip device.

The circuit breaker comprises an electronic processing unit 6 designed to control an actuator 7 from a signal Is representative of the intensity of the primary current in at least one main conductor of the circuit breaker. In the embodiment represented in FIG. 1, supply of the signal Is representative of the intensity of the primary current is performed by separate means 8 comprising a current sensor. It could have been envisaged to use the same current sensors to supply both a supply current Ia to the power supply circuit 4, and to supply a signal Is representative of the intensity of the primary current to the electronic processing unit. The actuator 7 enables the main conductors 1 to be opened by means of a mechanism 9 acting on opening of the contacts 2.

In this way, the power supply circuit 4 supplies a supply voltage to the actuator 9. The power supply circuit 4 is provided with a voltage regulator designed to supply a supply voltage VA to supply the electronic processing unit 6.

Figure 2:
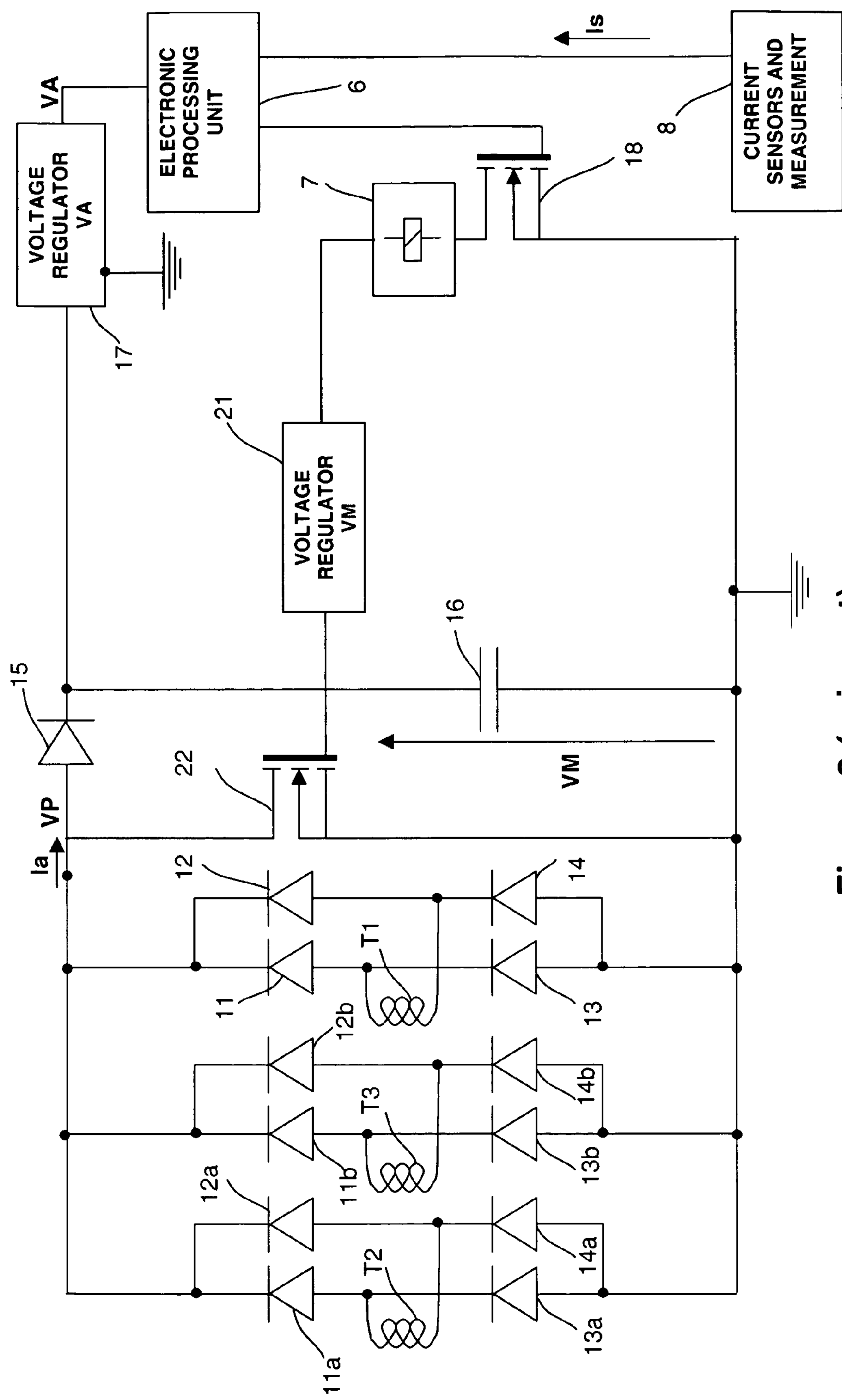
FIG. 2 represents a diagram of a trip device according to the prior art.

In the electronic trip device according to the prior art represented in FIG. 2, the secondary winding of the current sensor T1 is connected to a rectifier bridge formed by a group of four diodes 11 to 14. A first end of the secondary winding is connected to the anode of a first diode 11 and to the cathode of a second diode 13, whereas a second end of the secondary winding is connected to the anode of a third diode 12 and to the cathode of a fourth diode 14. The cathodes of the first and third diodes, 11 and 12, are connected to a positive power supply line VP. The anodes of the second and fourth diodes, 13 and 14, are connected to an electric reference ground of the trip device. The other sensors T2 and T3 are connected in the same way to two rectifier bridges, respectively represented by diodes 11*a*, 12*a*, 13*a*, 14*a* and 11*b*, 12*b*, 13*b* and 14*b*. The cathodes of the diodes 11*a*, 11*b*, 12*a* and 12*b* are connected to the line VP. The anodes of the diodes 13*a*, 13*b*, 14*a* and 14*b* are connected to the electric reference ground of the trip device.

The supply current Ia flows in the positive power supply line VP via a diode 15 so as to charge a storage capacitor 16. Thus the voltage VM at the terminals of the storage capacitor enables the actuator to be supplied with electric power. The supply current Ia also supplies a voltage regulator 17 designed to regulate a supply voltage VA of the processing unit.

Other means 8 for sensing and measuring current enable a signal Is representative of at least one primary current to be supplied to the electronic processing unit 6. When the primary current exceeds a tripping threshold of the circuit breaker, the electronic processing unit 6 transmits a tripping order of the actuator 7 to a control transistor 18. The energy stored in the storage capacitor 16 is then used to supply the actuator.

The voltage VM at the terminals of the storage capacitor, designed to supply electric power to the actuator, is regulated by means of a voltage regulator 21 by measuring the voltage VM and supplying a control order to the gate of a transistor 22. The diode 15 enables the supply current Ia to flow to charge the capacitor 16. As soon as the voltage VM has reached an operating value, the voltage regulator 21 transmits a control order enabling the supply current Ia to be diverted. When the voltage VM is lower than the operating value, the voltage regulator transmits a control order enabling flow of the supply current Ia to be re-established to recharge the storage capacitor 16.

Figure 3:
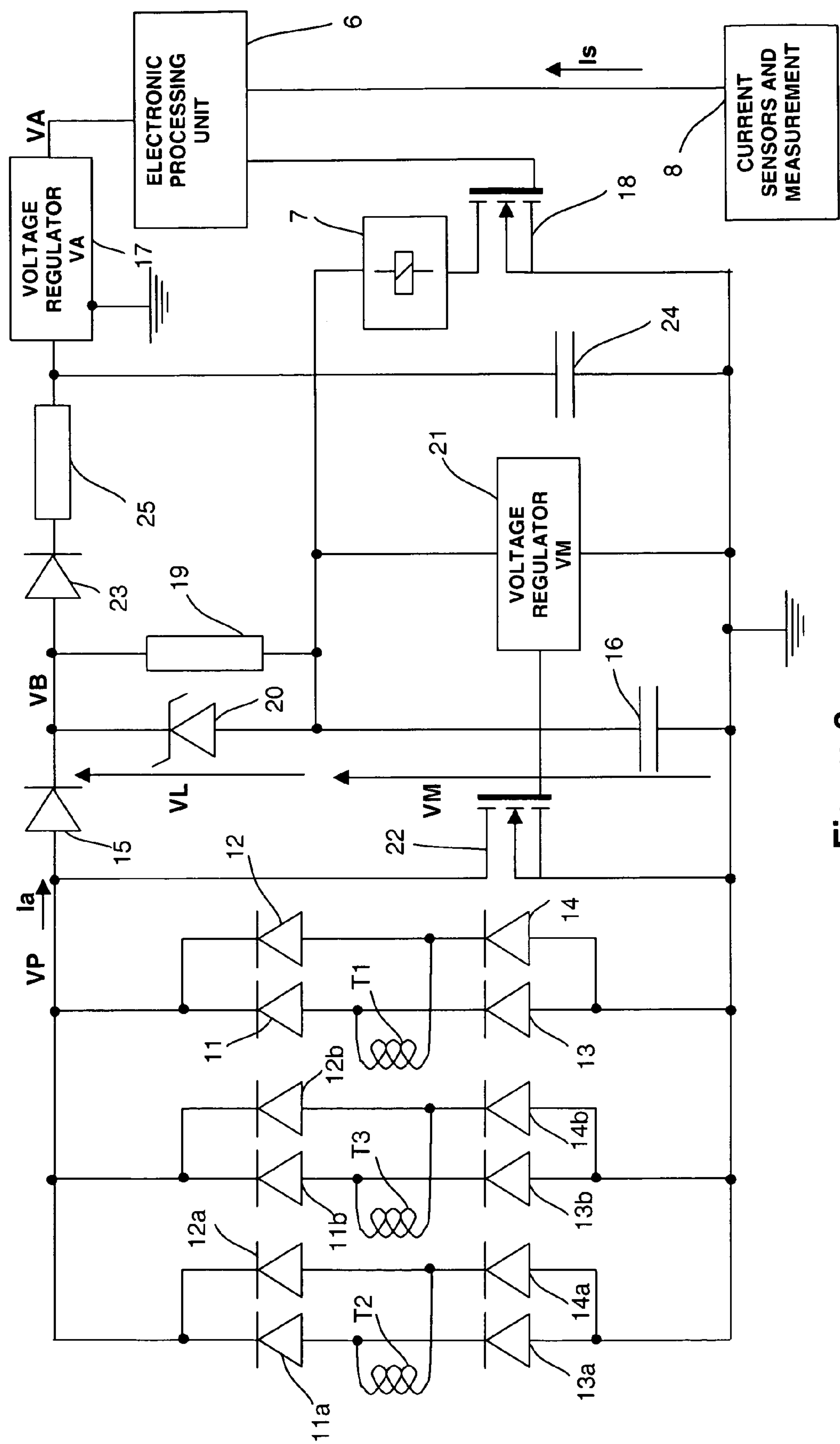
FIG. 3 represents a diagram of a trip device according to an embodiment of the invention.

The electronic trip device represented in FIG. 3 comprises the components represented in FIG. 2 and described above. The electronic trip device of FIG. 3 comprises, in addition, voltage raising means designed to supply a raised voltage VB to the voltage regulator 17, said raising means being connected between the cathode of the diode 15 and the storage capacitor 16. In the case represented in FIG. 3, the raising means comprise a resistor 19 and a voltage-limiting diode 20 reverse-mounted parallel to said resistor, so that, when the storage capacitor 16 is charged, the raised voltage VB quickly reaches a value equal to the sum of the voltage VM at the terminals of the capacitor and of the limiting voltage VL of said diode 20. As soon as the storage capacitor 16 starts charging, at least a part of the supply current Ia flows via the resistor 19. When the voltage at the terminals of the resistor 19 reaches the limiting voltage, the voltage-limiting diode 20 holds this voltage at a value equal to said limiting voltage VL. In this way, the raised voltage quickly reaches a value equal to the limiting voltage VL, at the beginning of charging of the storage capacitor 16.

The voltage-limiting diode can advantageously present a limiting voltage VL greater than or equal to the nominal value of the supply voltage VA of the electronic processing unit, which enables the electronic processing unit to operate as soon as the storage capacitor 16 starts charging. In this way, when the circuit breaker is powered on, the electronic processing unit 6 is powered-on with a shorter delay.

The voltage VM at the terminals of the storage capacitor, designed for electric power supply of the actuator, is regulated by means of the voltage regulator 21. This regulator enables the power dissipated by the supply current Ia in the resistor 19 and diode 20 to be reduced.

When the circuit breaker is powered on, a diode 23 makes the secondary current flow to charge a capacitor 24 designed to supply the voltage regulator 17. The capacitor 24 combined with a resistor 25 also performs filtering of the raised voltage VB at the input of the voltage regulator 17.

Figure 4:
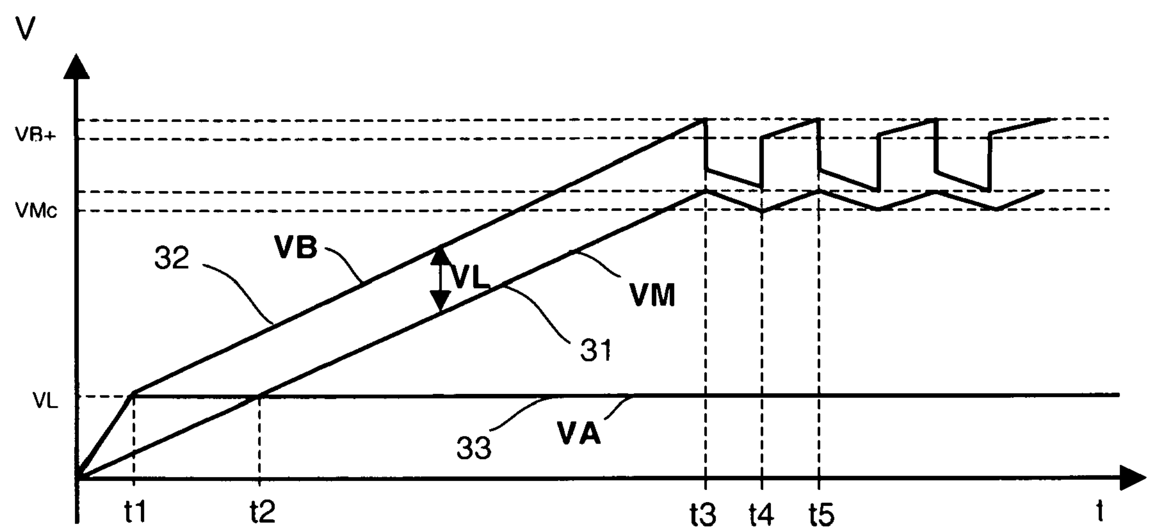
FIG. 4 illustrates, on curves 3.a to 3.c, various voltage signals in a trip device according to FIG. 3, during a transient power-on phase of the circuit breaker.

The changing values of the voltages VM, VB, and VA versus time are respectively represented by the curves 31, 32 and 33 of FIG. 4, during a transient power-on phase of a circuit breaker.

Up to the time t1, a part of the supply current Ia flows through the resistor 20, via the diode 15, to charge the storage capacitor 16. Another part of the current Ia flows through the diode 23 and the resistor 25 to charge the capacitor 24. The raised voltage VB very quickly reaches a value equal to the limiting voltage VL of the diode 20, which is in this instance substantially equal to the nominal value of the supply voltage VA of the electronic processing unit. Thus, at the time t1, the raised voltage VB has a value substantially equal to the nominal value of the voltage VA. The voltage regulator 17 is therefore sufficiently supplied to deliver a voltage equal to the nominal value of the voltage VA.

It can be noted that at the time t1, the value of the voltage VM at the terminals of the storage capacitor 16 is significantly lower than the nominal value of the voltage VA. Compared with the trip device of the prior art in which the voltage regulator 17 is directly supplied by the voltage VM at the terminals of the storage capacitor, this value of the voltage VM would still not be sufficient to enable the voltage regulator 17 to deliver a nominal supply voltage of the electronic processing unit.

Between the times t1 and t3, the supply current Ia is used to charge the storage capacitor 16. The raised voltage VB is substantially equal to the sum of the voltage VM at the terminals of the storage capacitor 16 and of the limiting voltage VL of the diode 20.

It should be noted that at the time t2, the voltage VM at the terminals of the storage capacitor is equal to the nominal value of the voltage VA. Compared with a trip device of the prior art in which the voltage regulator 17 is supplied by the voltage VM at the terminals of the storage capacitor, it is only at this time t2 that this voltage VM is sufficient to enable the voltage regulator 17 to deliver a voltage equal to the nominal value of the voltage VA. Thus, in this embodiment, the trip device of the invention enables power-on of the electronic processing unit to be advanced. The gain in time compared with a trip device of the prior art in which the voltage regulator 17 is supplied by the voltage VM at the terminals of the storage capacitor is t2-t1.

At the time t3, the voltage VM reaches an operating value VMc and the voltage regulator 21 transmits a control order to the transistor 22 to divert the secondary current. The raised voltage VB for its part reaches a maximum value VB+ substantially corresponding to the sum of the operating value VMc and of the limiting voltage VL. Between the times t3 and t4, the voltages VM and VB decrease due to the fact that the storage capacitor 16 discharges. At the time t4, the voltage VM reaches a value lower than the operating value VMc and the voltage regulator 21 transmits a control order to the transistor 22 to divert the secondary current to recharge the storage capacitor 16. At the time t5, regulation of the voltage VM repeats the cycle comprised between the times t3 and t5.

Figure 5:
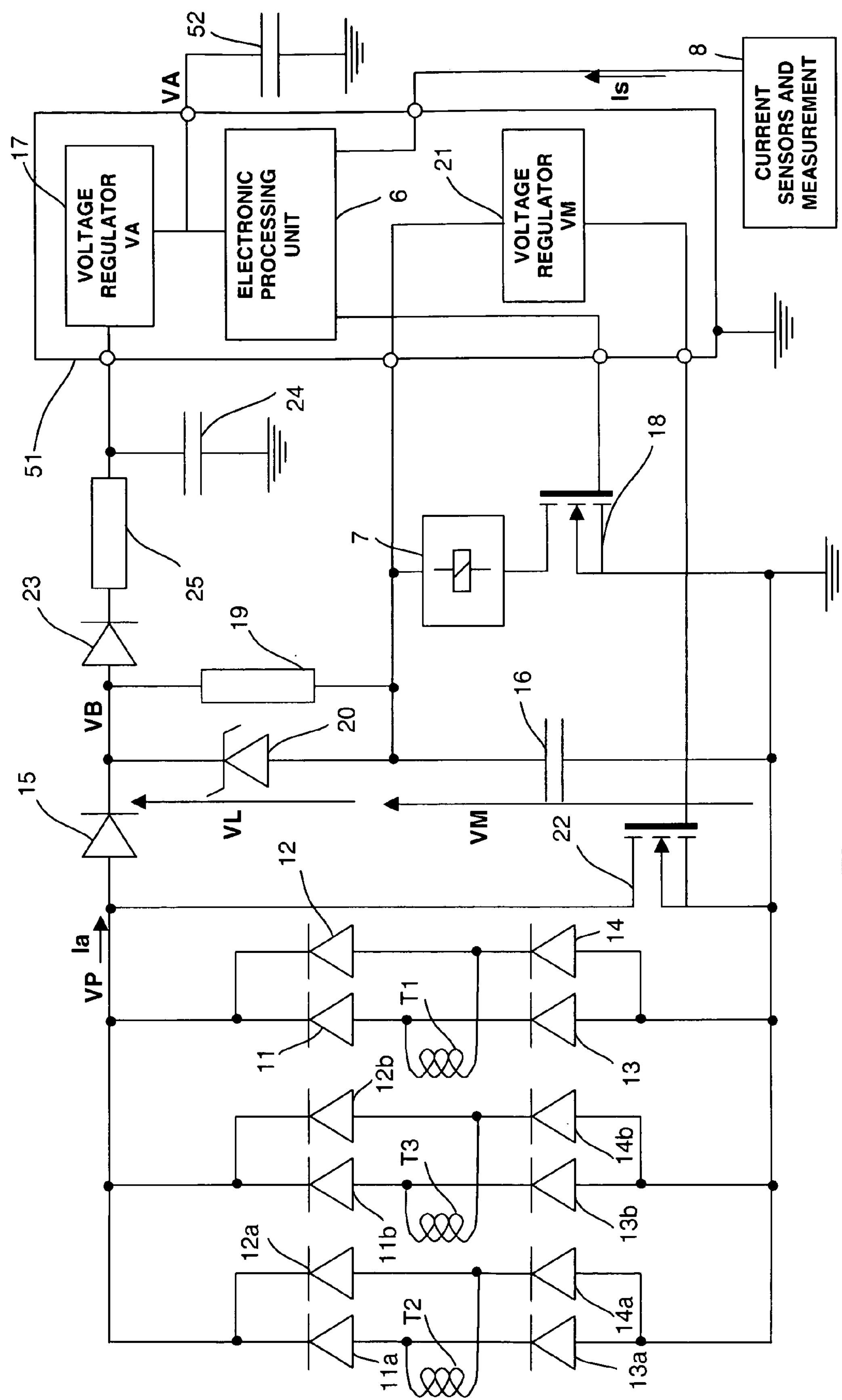
FIG. 5 represents a diagram of a trip device according to an embodiment of the invention comprising an integrated circuit.

The electronic trip device of FIG. 5 comprises an integrated circuit 51 comprising, among other components, the voltage regulator 17, the electronic processing unit and the voltage regulator 21. The integrated circuit comprises an output of the voltage regulator 17 connected to a capacitor 52 connected to an electric reference ground.

In the embodiment presented above, the raising means can comprise a resistor 19 and/or a voltage limiter 20 in series with the storage capacitor. In other embodiments, the raising means can comprise other electronic circuits enabling the voltage to be raised, such as for example semi-conductor circuits or integrated circuits.

One advantage of the trip device according to the invention is to ensure that the electronic processing unit is powered-on as soon as possible when the circuit breaker is powered-on.

The invention claimed is:

1. An electronic trip device comprising:

at least one current sensor for supplying a secondary current representative of a primary current in a main conductor of a circuit breaker, a rectifying circuit for rectifying the secondary current and for supplying a supply current, an electronic processing unit for controlling an actuator capable of actuating an opening mechanism of the main conductor, and an electric power supply circuit having a storage capacitor for supplying the actuator with electric power and a voltage regulator for supplying a supply voltage to the electronic processing unit, said storage capacitor being charged by the supply current, wherein the power supply circuit comprises voltage raising means supplying a raised voltage to an input of the voltage regulator, said raised voltage being greater than a voltage at the terminals of the storage capacitor, the voltage raising means comprise a voltage limiter connected in series with the storage capacitor, for accelerating an increase in voltage level of the raised voltage when the supply current flows to charge said storage capacitor, and for enabling the raised voltage to reach a value greater than or equal to the sum of the voltage at the terminals of said capacitor and of a limiting voltage of said voltage limiter, and the voltage raising means further comprise a resistor connected in series with the storage capacitor such that when the supply current flows to charge said storage capacitor, the raised voltage has a value greater than or equal to the sum of the voltage at the terminals of said capacitor and of the voltage at the terminals of said resistor.

2. Electronic trip device according to claim 1, wherein the voltage limiter is a voltage-limiting diode presenting a limiting voltage, said diode being reverse-connected.

3. Electronic trip device according to claim 1, wherein the voltage raising means comprise a resistor and a voltage limiter connected in parallel.

4. Electronic trip device according to claim 1, wherein the limiting voltage is greater than or equal to a nominal value of the supply voltage of the electronic processing unit.

5. Electronic trip device according to claim 1, wherein the voltage at the terminals of the storage capacitor is regulated by a voltage regulator.

6. Electronic trip device according to claim 1, comprising means for filtering the raised voltage connected up-line from the voltage regulator designed to supply the supply voltage to the electronic processing unit.

7. A circuit breaker comprising:

at least one main conductor, an opening mechanism of the main conductor, an actuator designed to actuate the opening mechanism, and a trip device with an electronic processing unit to control the actuator and an electric power supply circuit designed to supply electric power to the actuator equipped with a voltage regulator designed to supply a supply voltage to the electronic processing unit, the trip device comprising:

at least one current sensor for supplying a secondary current representative of a primary current in a main conductor of a circuit breaker, a rectifying circuit for rectifying the secondary current and for supplying a supply current, an electronic processing unit for controlling an actuator capable of actuating an opening mechanism of the main conductor, and an electric power supply circuit having a storage capacitor for supplying the actuator with electric power, and a voltage regulator for supplying a supply voltage to the electronic processing unit, said storage capacitor being charged by the supply current, wherein the power supply circuit comprises voltage raising means for supplying a raised voltage to an input of the voltage regulator, said raised voltage being greater than a voltage at the terminals of the storage capacitor, the voltage raising means comprise a voltage limiter connected in series with the storage capacitor, for accelerating an increase in voltage level of the raised voltage when the supply current flows to charge said storage capacitor, and for enabling the raised voltage to reach a value greater than or equal to the sum of the voltage at the terminals of said capacitor and of a limiting voltage of said voltage limiter, and the voltage raising means further comprise a resistor connected in series with the storage capacitor such that when the supply current flows to charge said storage capacitor, the raised voltage has a value greater than or equal to the sum of the voltage at the terminals of said capacitor and of the voltage at the terminals of said resistor.

* * * * *